INVENTOR.
Clayton C. DeWitt
BY
Morris h Rabkin
ATTORNEY.

April 12, 1960 C. C. DE WITT 2,932,522

PHONOGRAPH RECORD

Filed Nov. 28, 1955 2 Sheets-Sheet 2

INVENTOR.
Clayton C. DeWitt
BY Morris L. Rabkin
ATTORNEY.

United States Patent Office 2,932,522

Patented Apr. 12, 1960

2,932,522

PHONOGRAPH RECORD

Clayton C. De Witt, Haddonfield, N.J., assignor to Radio Corporation of America, a corporation of Delaware Application November 28, 1955, Serial No. 549,469

4 Claims. (Cl. 274—42)

Figure 1:
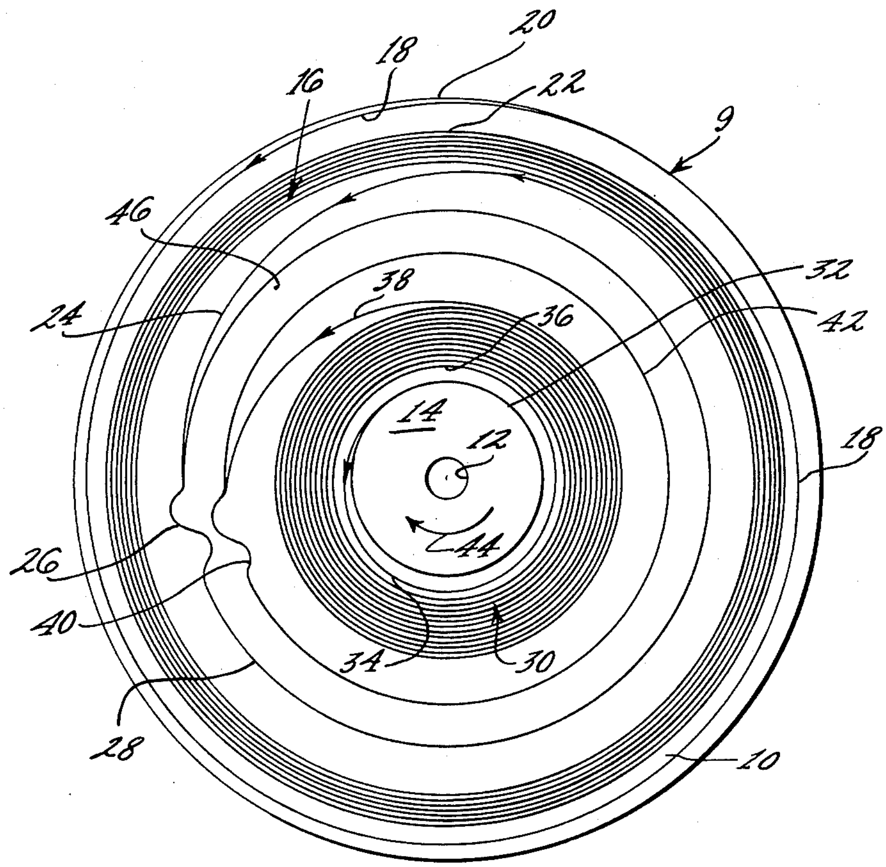

This invention relates to phonograph records, and more particularly to phonograph records of the type that have two separate sound transcriptions on at least one side thereof. The phonograph records of the present invention are particularly adapted for use in automatic radio programming devices and in juke boxes.

In the use of automatic radio programming devices of the type adapted to provide a plurality of audio transcriptions in a desired time sequence, and in the use of juke boxes, there has been a tendency to provide a plurality of transcriptions with a minimum number of records. It has been proposed, for example, to produce a phonograph record having at least two sound transcriptions on one side thereof. In playing these records, it is necessary, however, to play the sound transcriptions consecutively, in a predetermined order, because the starting point of the first sound transcription is the only definite starting point of two sound transcriptions that is easily determined. Where the two sound transcriptions on one side of a phonograph record are of unequal time duration, the starting point of the second transcription will be in a position on the record that may vary with the length of the first sound transcription. This starting point of the second transcription may be at the end of the first transcription, or it may be spaced from it along the record surface. In any case, the starting point of the second transcription is not at a definite and easily located point without benefit of the invention disclosed herein.

Accordingly, it is an object of the present invention to provide an improved record having two separate sound tracks on one side thereof wherein the starting point of each sound track is at a definite point determined by the nature of the record.

It is another object of the present invention to provide an improved phonograph record having at least two transcriptions on one side thereof wherein each transcription is of a different length, and each transcription has a predetermined starting point.

Still another object of the present invention is to provide an improved phonograph record having two separate and distinct sound tracks formed on one side thereof wherein each sound track has a definite predetermined starting point and a common terminating point.

A further object of the present invention is to provide an improved record having two separate selections recorded thereon wherein one selection is recorded by a sound track spiraling progressively outwardly, and the other selection is recorded by a sound track spiraling progressively inwardly in the same angular direction.

Still a further object of the present invention is to provide a phonograph record having at least two sound transcriptions on one side thereof adapted for use in automatic radio programming devices, juke boxes, and the like, that is simple in construction and operation, easy and economical to manufacture, and highly efficient in use.

In accordance with the present invention the foregoing objects and related advantages are attained in an improved record having at least two selections, or sound transcriptions, recorded on one side of the record. The record may comprise a phonograph record disc having a first selection transcribed in the form of a spiral groove, or sound track, progressing inwardly and a second sound track recorded as a sound track progressing outwardly. In other words, the first selection of the record is recorded by the method of outside-in recording, and the second selection of the record is recorded by the method of inside-out recording. The two sound tracks are adjacent to each other, that is, they are side-by-side; but they do not overlap each other. Thus, the starting point of the first recording is adjacent the outer edge of the record disc, and the starting point of the second recording is adjacent the inner edge of the record disc. The two starting points are fixed by the nature of the record and are readily found. Precision of timing, when the record is played, therefore, is facilitated. The first and second recordings are formed in a manner whereby they progress toward each other in the same angular direction. Hence, if the record is adapted to be turned in a clockwise direction by a record player, both the first and second transcriptions will progress from their respective starting points spirally toward each other in a counterclockwise direction. The first and second transcriptions may share a single trip-out groove and signal, or each may have its own trip-out means.

Figure 2:
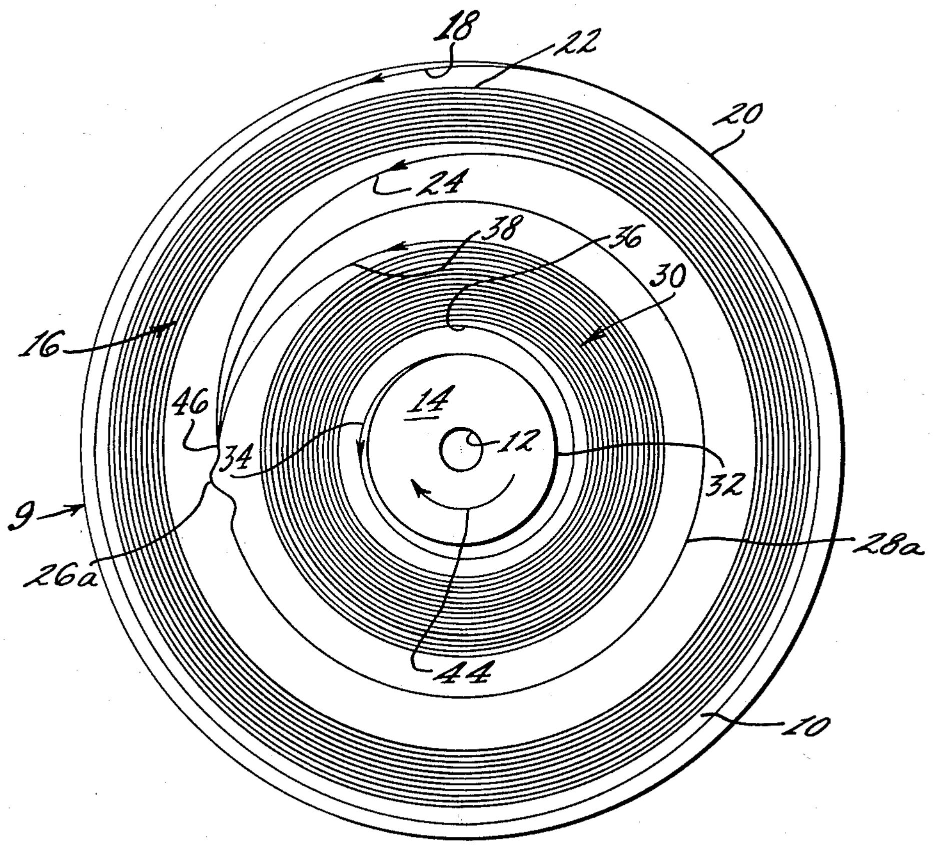

The novel features of the present invention, as well as the invention itself, both as to its organization and method of operation, will be understood in detail from the following description when considered in connection with the accompanying drawing in which similar reference characters represent similar parts, and in which:

Fig. 1 is a plan view of a record having two separate recordings on one side thereof, in accordance with the present invention; and Fig. 2 is a view similar to Fig. 1 of a modification.

Referring now particularly to Fig. 1, there is shown a record 9 in the form of a phonograph record disc 10. The record disc 10 is formed with a central opening 12 for receiving the spindle of a record player (not shown) therethrough. An annular label 14 may be fixed to the face of the record disc 10 and disposed about the central opening 12.

The record disc 10 has at least two audio transcriptions, that is, at least two separate and distinct sound grooves, or record tracks, formed on one side thereof. A first transcription 16 is recorded on the record disc 10 by a sound groove, or record track, progressing spirally inwardly, as by outside-in recording. Thus, the transcription 16 comprises a lead-in groove, or lead-in track 18, starting at substantially the periphery, or outer edge 20, of the record disc 10. After about one revolution of the lead-in track 18, the actual recording of the audio transcription 16 begins, as at 22. The transcription 16 progresses spirally inwardly toward the label 14 and ends in a trip-out groove, or trip-out track 24. The trip-out track 24, like the lead-in track 18, is of relatively low pitch compared to the major portion of the transcription 16. By the term "pitch," as used herein, is meant the number of recorded tracks per inch. The trip-out track 24 may contain a trip-out signal 26 of a predetermined frequency, such as a subaudible frequency in order to operate an electro-mechanical trip-out device in a record player for the purpose of lifting the tone arm (not shown) of the record player and changing records. The trip-out track 26 may also actuate a trip mechanism of a velocity, acceleration, or displacement variety, well known in the art. While the trip-out signal 26 is shown as being of a subaudible type, it will be understood that the trip-out signal 26 may also be of the supersonic type, well known in the art. The trip-out signal 26 communicates with a terminating groove, or terminating track 28, which, in turn, communicates with the trip-out track 24. With this construction, the stylus of a phonograph pick-up will not proceed beyond the terminating track 28, after reproducing the first transcription 16.

A second sound transcription 30 is recorded on the same side of the record disc 10 as is the first transcription 16. The second transcription 30 starts at substantially the periphery 32 of the label 14, that is, at the inner edge of the recording surface, with a lead-in track 34. The actual sound transcription may begin after the lead-in track 34 has made about one revolution, as at 36. The length of the second transcription 30 may vary in time duration from that of the first transcription 16. The second transcription 30 may end in a trip-out track 38 of relatively low pitch. The trip-out track 38 may communicate with a trip-out signal 40, which, in turn, communicates with a terminating track 42. The terminating track 42 communicates with the trip-out track 38 so that the stylus of a transducer (not shown) will not pass beyond the terminating track 42, after the second transcription 30 has been played.

It will be understood that the angular direction of the spiral track of the first transcription 16 and that of the second transcription 30 is the same. Thus, if the record is designed to be turned in the direction of the arrow 44, that is clockwise, the angular direction of recording of both the first transcription 16 and of the second transcription 30 is counterclockwise. The first transcription 16 does not overlap the second transcription 30, and both transcriptions are separated from each other by an idle space, or land 46. The starting point of the first sound transcription 16 may be said to be the lead-in groove 18 generally, or the point 22 specifically. With respect to the second transcription 30, the starting point may be said to be the lead-in groove 34 generally, and the point 36 specifically. The beginning of the first transcription 16 and the beginning of the second transcription 30 may, therefore, be said to begin at points 22 and 36, respectively, on the same radius of the record disc 10. It will be noted that the point 22 is a definite predetermined fixed point, that may be easily determined by the transducer of a record player. Also, the starting point 36 of the second transcription 30 is also a predetermined fixed point that may be easily determined by the transducer of a record player. The points 22 and 36, therefore, may be points spaced apart by a predetermined distance on the recording surface of subsequent records of the same type as the record 10, to indicate the starting points of each of two separate and distinct selections.

Referring now to Fig. 2 there is shown a record 9, similar to the record 9 in Fig. 1, having two separate and distinct selections 16 and 30 recorded on one side thereof in a side-by-side relationship. The record illustrated in Fig. 1 differs from the record illustrated in Fig. 2 in that the latter uses a single trip-out signal **26*a* that communicates with the trip-out tracks 24 and 38 of the transcriptions 16 and 30, respectively. The trip-out signal 26*a* communicates with a terminating track 28*a* which, in turn, communicates with the trip-out tracks 24 and 38 of the transcriptions 16 and 30, respectively. Thus, the trip-out tracks 24 and 38 may meet substantially in a point 46 so that a stylus (not shown) moving in the groove of either the transcription 16 or the transcription 30 will not go beyond the terminating groove 28*a* after reproducing either the transcription 16 or 30**.

Thus, there has been shown and described herein, in accordance with the objects of the present invention, an improved record having at least two separate selections transcribed on one side of the record. One transcription progresses from the outer edge of the record spirally inwardly and terminates in a trip-out track that may include a trip-out signal for the purpose of lifting a transducer adapted to contact the record. A second transcription is recorded from a starting point adjacent an inner edge, parallel and opposite to the outer edge and progresses spirally outwardly up to, but not overlapping, the first transcription. Each separate transcription may terminate with its own individual terminating track or may share terminating means common to both transcriptions.

What is claimed is:

1. A circular disc sound record capable of being moved in one direction only during sound reproduction and having a surface presenting two independent non-overlapping recordings, one of said recordings starting at a given position on said surface adjacent the outer periphery thereof, and the other of said recordings starting at a position on said surface adjacent the center thereof.

2. A phonograph record comprising a disc having a recording surface bounded by a pair of oppositely spaced edges, a first transcription comprising a track beginning adjacent one of said edges, a second transcription comprising a track beginning adjacent the other of said edges, each of said tracks progressing toward each other in the same angular direction, and separate terminating means for each of said tracks.

3. A phonograph record comprising a disc having a recording surface bounded by a pair of parallel oppositely spaced edges, a first transcription comprising a track beginning adjacent one of said edges, a second transcription comprising a track beginning adjacent the other of said edges, and each of said tracks progressing toward each other in the same angular direction, terminating means on said discs positioned between said first and second transcriptions, and each of said tracks terminating with said terminating means in common.

4. A phonograph disc formed with two separate sound tracks on one surface thereof, one of said tracks progressing spirally inwardly, the other of said tracks progressing spirally outwardly, a separate terminating means for each track, a land between said terminating means, and each of said tracks progressing toward each other in the same angular direction.

References Cited in the file of this patent

UNITED STATES PATENTS

| | | |
|---|---|---|
| 785,191 | Berliner | Mar. 21, 1905 |
| 978,722 | Fajen | Dec. 13, 1910 |
| 1,303,074 | Leake | May 6, 1919 |
| 1,483,039 | Bickel | Feb. 5, 1924 |
| 2,262,732 | Gruber | Nov. 11, 1941 |
| 2,549,066 | Dixon | Apr. 17, 1951 |
| 2,703,241 | Abramson | Mar. 1, 1955 |